UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS FOR TREATING ELECTROMETALLURGICAL PRODUCTS.

1,099,674.  Specification of Letters Patent.  Patented June 9, 1914.

No Drawing.  Application filed September 17, 1910.  Serial No. 582,516.

*To all whom it may concern:*

Be it known that I, FRANK J. TONE, a resident of Niagara Falls, in the county of Niagara and State of New York, have invented a new and useful Process for Treating Electrometallurgical Products, of which the following is a full, clear, and exact description.

My invention relates to electrometallurgical products, which are ordinarily used for abrasive or refractory purposes; and its object is to so treat them as to remove certain impurities from these products and increase their bonding qualities. This treatment is suitable for a large number of electrometallurgical products, such for instance, as carbids of silicon, boron, titanium, the aluminous products from ores of aluminum such as bauxite and aluminous silicates, and the products formed by smelting aluminous ores with other oxids such as titanium oxid and silicic oxid. In the formation of these electrometallurgical products, impurities in the raw materials used cause certain impurities in the products, usually carbids and silicids of iron and aluminum, or metallic alloys. The impurities act in a manner very detrimental to the bond used to form abrasive or refractory articles. If a vitrified binder is used, the impurities flux the bonding materials and prevent the formation of homogeneous articles, and with many adhesive binders they react with the binding material so as to decompose it and prevent the formation of abrasive or refractory articles of any strength or wearing qualities. These impurities can be partly separated by mechanical means, but it is found that they often adhere so closely to the abrasive material that it is impossible to remove them by other than chemical treatment. I have found that by suitably treating such products with chlorin, these impurities can be largely or wholly removed and the bonding qualities of the abrasive materials greatly improved.

In carrying out my invention, I preferably take the electrometallurgical products and crush them to the size or sizes most suitable for the abrasive or refractory article to be manufactured. This crushed material, usually in grain form, is then placed in a suitable vessel and subjected to the action of chlorin, preferably under the action of heat and pressure. I have found that the useful material itself is not injuriously affected or acted upon at a temperature at which the various impurities are decomposed and that these impurities may thus be substantially eliminated without affecting the abrasive materials. The length of treatment and the amount of chlorin required depend on the amount and composition of the impurities present; and I may vary the treatment in order to suit the conditions that exist. After this treatment, the material may then be washed with water or dilute acid and be otherwise treated as is found suitable for making abrasive or refractory articles.

In removing impurities for example from the crystalline alumina-silica material, made according to U. S. Patent No. 906339, issued March 17th, 1908, to Frank J. Tone, I preferably place the chlorin in contact with the suitably crushed material, which is heated to a temperature of 600° to 1000° centigrade, preferably in a rotary kiln which is lined with a suitable material which is resistant to the chlorin gases, for example, with fused quartz, and it is so designed that the chlorin gases can be kept under pressure. The impurities to be removed are firstly, an alloy of iron titanium and silicon, and secondly, a carbid or suboxid of aluminum, and under these conditions there are formed the chlorids of iron silicon, titanium and aluminum, which are volatilized or are removed by subsequent treatment with water or dilute mineral acid. Since these impurities are very intimately in contact with the abrasive material their removal roughens and makes irregular the surface of the grain and causes it to have much better binding qualities. I have found that articles formed from material treated in this manner are very homogeneous in character and have increased strength and wearing qualities.

I claim:

1. The process of removing impurities from electrometallurgical products used for abrasive or refractory purposes, which consists in treating said products with chlorin gas in sufficient quantities to combine with the impurities present.

2. The process of removing impurities from electrometallurgical products used for abrasive or refractory purposes, which consists in treating said products with chlorin in sufficient quantities to combine with the impurities present and under the action of heat.

3. The process of removing the carbids and silicides which exist as impurities in electrometallurgical products used for abrasive or refractory purposes, which consists in treating said products with chlorin under the action of heat and pressure.

4. The process of treating electrometallurgical products used for abrasive or refractory purposes, which consists in treating said products with chlorin gas in sufficient quantities to combine with the impurities present and then removing the reaction products formed by the impurities and the chlorin gas.

In testimony whereof, I have hereunto set my hand.

FRANK J. TONE.

Witnesses:
RICHARD FRANCHOT,
PHILIP P. BARTON.